US006336959B1

(12) United States Patent
Kamo

(10) Patent No.: US 6,336,959 B1
(45) Date of Patent: Jan. 8, 2002

(54) SOLUTION FEEDING APPARATUS AND METHOD OF FEEDING SOLUTION

(75) Inventor: Hisao Kamo, Matsudo (JP)

(73) Assignee: Chugai Photo Chemical Co., Ltd, Tokyo (JP)

( * ) Notice: Subject to any disclaimer, the term of this patent is extended or adjusted under 35 U.S.C. 154(b) by 0 days.

(21) Appl. No.: 09/459,818

(22) Filed: Dec. 13, 1999

(30) Foreign Application Priority Data

Jul. 12, 1999 (JP) .......................................... 11-197163
Aug. 20, 1999 (JP) .......................................... 11-233716

(51) Int. Cl.[7] ............................................... B01D 19/00
(52) U.S. Cl. ............................. 95/241; 95/266; 96/155; 96/156; 96/193
(58) Field of Search .......................... 95/241, 243, 246, 95/247, 254, 258, 266; 96/155, 156, 193

(56) References Cited

U.S. PATENT DOCUMENTS 4,915,713 A * 4/1990 Buzza et al. .................. 95/266
4,935,151 A * 6/1990 Do .............................. 95/266
5,096,602 A * 3/1992 Yamauchi et al. ............ 95/241
5,584,416 A * 12/1996 Florian ........................ 95/266
5,792,237 A * 8/1998 Hung et al. .................... 95/241
5,900,045 A * 5/1999 Wang et al. .................. 96/155
5,931,349 A * 8/1999 Yoo ............................ 96/155
5,989,317 A * 11/1999 Huang et al. .................. 95/241
6,193,783 B1 * 2/2001 Sakamoto et al. ............ 95/247

FOREIGN PATENT DOCUMENTS

JP 11-52533 2/1999
JP 11-102056 4/1999

* cited by examiner

*Primary Examiner*—Duane S. Smith
(74) *Attorney, Agent, or Firm*—Hahn Loeser + Parks LLP

(57) ABSTRACT

The invention is directed to an apparatus and method for feeding solution from a container with high accuracy. An embodiment of the apparatus is provided as a container hermetically containing a solution is made of a high polymer that permits the container to change its shape in accordance with the amount of its content. The container is removably connected to a tube for forming an isolated conduit extending from the container via a pump to the destination to which the solution is fed. The isolated conduit is provided with a gas-liquid separation tank for separating gas from the solution and a gas trap section communicating with the gas-liquid separation tank. The gas-liquid separation tank and the gas trap section are located between the container and the pump, and the gas trap section has a variable volume. Further, a desired number of isolated conduits may extend via respective pumps to the destination to which the solution is fed. Any one of the isolated conduits may selectively be operated by a respective gas detection sensor installed in the corresponding gas trap section. The gas trap section is preferably adapted to confine therein the gas separated in the gas-liquid separation tank, and has a variable volume, although the gas-liquid separation tank is ensured to maintain a constant volume until all the solution in the container is consumed.

12 Claims, 12 Drawing Sheets

SOLUTION FEEDING APPARATUS AND METHOD OF FEEDING SOLUTION

FIELD OF THE INVENTION

The present invention relates to a solution feeding apparatus and a solution feeding method using said apparatus. More particularly, the invention relates to an apparatus and a method which may be used, for example, to replenish a processing solution for processing a silver halide photographic material using an automatic developing apparatus.

BACKGROUND OF THE INVENTION

Typical examples of methods of processing a silver halide photographic material after exposure of the photographic material to a light image include those which are employed for processing a monochrome photograph and comprised of such processes as developing, fixing, water washing and drying; those employed for processing a color negative film and comprised of such processes as color developing, fixing water washing, stabilizing and drying; and those employed for processing a color paper and comprised of such processes as color developing, bleaching fixing, water washing, stabilizing and drying. These processes are usually conducted with an automatic developing apparatus by using respective processing solutions. As use of an automatic developing apparatus is becoming more commonplace, using a rinse or other substitute solution in lieu of water washing is on the increase. Compositions of these solutions and fixing solutions change as a result of processing a silver halide photographic material. In addition, with the elapse of time, developing solutions and fixing solutions suffer from decrease in their effectiveness due to air oxidation. In order to prevent these problems and maintain the processing solutions sufficiently effective during continuous processing using an automatic developing apparatus, it is common practice to replenish each respective processing solution with a replenishment solution having a composition either the same as or similar to that of the processing solution.

Each solution for processing a silver halide photographic material is usually supplied in the form of a condensed liquid and needed to be diluted with water to a given concentration before actually used. In this case, the dilution has to be done precisely; a silver halide photographic material processed with an inaccurately diluted processing solution may result in a finished photograph having a considerably poor quality.

Some kind of solution, such as a color developing solution or a bleaching fixing solution, is supplied in a plurality of solution parts in order to increase the preservability of the condensed solution by separating ingredients from other ingredients that are not desirable to contact therewith. When actually used, such a solution has to be prepared by mixing the concentrated stock solutions, each of which usually consists of two to four solution parts, while diluting the mixture with water. During this mixing process, various accidents, such as mistaking a solution part for that of another processing solution, often happen. It is not uncommon that such a mistake seriously and irreparably impairs the quality of the finished photograph.

As described above, preparation of processing solutions imposes a heavy burden on the operator, because it is not only complicated but also requires precision. Furthermore, it often happens that a condensed solution or a prepared solution spill or spatter onto nearby objects, such as a human body, clothes or furniture and equipment, sometimes contaminating or otherwise damaging the objects. In order to prevent these problems, it has been practiced to supply each processing solution in the form of a ready-to-use solution, with the conditions of the solution adjusted beforehand. Nevertheless, supplying a solution in the form of a concentrated stock solution still has advantages in that it occupies less space for distribution or storage and that it has superior stability in preservation.

When solutions that have been prepared as above are used as replenishment solutions, the replenishment solutions for respective processing solutions are usually stored in separate replenisher tanks, from which a necessary quantity of each respective replenishment solution for the current stage of processing a silver halide photographic material is fed into a solution tank in the automatic developing apparatus with a pump or by other appropriate means. At that time, as the replenishment solutions in the replenisher tanks are stored in such a state as to be exposed to the air, they present the possibility of becoming concentrated due to evaporation of moisture as well as quality deterioration resulting from air oxidation. Should a processing solution be replenished with a replenishment solution that has thus become deteriorated or changed in quality, effectiveness of the processing solution decreases, resulting in poor image quality of the finished photograph.

Examples of means to prevent such a deterioration include a method that calls for disposing a floating lid or a floating ball in a replenisher tank to cover the surface of replenishment solution and thus reduce the area of the surface of the replenishment solution in contact with the air. However such a method has not yet succeeded in completely isolating a solution from air. In view of preservation of the environment and natural resources, the quantity of replenishment solution used for processing a silver halide photographic material is on the decrease in recent years. Therefore, if a replenishment solution is prepared in the same amount as before, it is stored in a replenisher tank for a longer period of time until it is used up and more prone to change in quality. Further, reduction in the amount replenished presents a problem in that even a minimal change in quality of a replenishment solution would make it difficult to maintain the constant effectiveness of the processing solution in an automatic developing apparatus and influence the quality of the finished photographs.

In order to prevent these problems, it is often practiced in recent years to feed a given quantity of water from a diluent water storage tank into a processing solution tank in an automatic developing apparatus simultaneously with sucking a formulated concentrate of processing solution out of its container and directly feeding it into the processing solution tank. Such a method has a benefit in that it eliminates the necessity of preparation of replenishment solutions. In many cases, the above method calls for a flow sensor installed in a container and acting as a solution depletion sensor to detect the solution in the container has been used up. Accordingly, such a method typically calls for using a stock solution container made of a polyethylene bottle or other hard-type bottle that will be free from the problem of becoming deformed when the content is reduced. When such a bottle is used, the quantity of air inside the container increases with the decrease of the stock solution in the container. Therefore, the method is not capable of solving the problem of the concentrated stock solution deteriorating due to contact with the air. The method presents another problem in that it is difficult to form a structure where the solution depletion sensor is prevented from registering detection by mistake when there still remains the solution in the container. In other words, it is difficult to use up the solution in the container; a certain amount of solution tends to remain in the container and often contaminate a human body, clothes or other objects in the environment at the time of disposal of the used container.

In order to solve the above problems, the applicant of the present invention had previously offered solution feeding methods and apparatuses used for said methods, which are disclosed in Japanese Patent Public Disclosure Nos. 52533-1999 and 102056-1999. The problem of a stock solution deteriorating due to exposure to air can be solved by any one of the above inventions by using a container made of a deformable material as a container to be filled with a concentrated stock solution and inserting a tube or other appropriate member into the stock solution container so as to suck the solution out of the container while maintaining the container airtight. Although the container is flexible, each one of the above inventions is capable of precisely detecting that the solution in the container has been used up.

However, each one of the above inventions has a drawback such that, for various reasons, the solution in a container sometimes fails to be fed accurately to the end, i.e., until the container is completely empty. Said various reasons typically include erroneous detection by a gas detection sensor and the air inadvertently entering the pump.

To be more specific:

(1) insufficient separation of gas from a solution in a gas-liquid separation tank or failure in directing the separated gas quickly into a gas trap section sometimes allows the gas mixed in the solution to escape from the gas-liquid separation tank into the pump, resulting in poor accuracy in the solution feeding rate;

(2) in cases where a tube or the like is not inserted deep enough into the container to reach the bottom of the container, the tube tends to suck in air from the container and activates a gas detection sensor prematurely, causing the solution to remain in the container;

(3) in cases where the output rate of the pump is insufficient, even after the solution in the container is completely suctioned out, the gas in the gas trap section fails to expand properly and prevents the sensor from detecting that the container is empty, consequently making it impossible for the operator to know precisely when to replace the container with a new one so that the operator may delay in replacing the container and suspend the supply of the solution;

(4) should the end of the tube or the suction inlet of a needle attached to the tube inserted in the container come into close contact with the inner wall of the container and prevent the tube from sucking in the solution, negative pressure may be generated in the solution conduit and cause erroneous actuation of the gas detection sensor, even when there is some solution remaining in the container; and (5) when the gas that has inadvertently entered the solution conduit is pushed back into the container, it sometimes happens that a part of the gas enters the pump without going back into the container.

In cases where any one of the aforementioned inventions is applied as a replenishing device incorporated with an automatic developing apparatus for processing silver halide photographic materials, the drawbacks described above may cause changes in compositions of processing solutions in the processing solution tank in the automatic developing apparatus or a processing solution to contaminate the body or clothes of a human when its container is replaced. For this reason, there has been a demand for improvement which prevents these problems from occurring in any circumstances.

Furthermore, each one of the above inventions has a structure such that the sensor or the equivalent means detecting complete consumption of the solution in the container automatically stops feeding of the solution or actuates an alarm to prevent the air from inadvertently entering the pump. This procedure is followed even when the solution is consumed in normal circumstances, requiring the operator to quickly replace the container each time. Delay in replacement is not desirable, because it prolongs the state where supply of the solution is halted. However, as it is not easy to have an operator constantly attend to the apparatus and replace the container immediately each time it is necessary, it often happens that feeding of the solution is halted for a long period of time.

A maintenance method employed at an unmanned processing laboratory often calls for an operator to patrol so as to visit each laboratory once every several days and prepare and add a replenishment solution only to each replenishment solution that has run low. Compared with such a method, each one of the aforementioned inventions is advantageous in that it eliminates the necessity of preparation of each solution and prevents deterioration of the solution for a long period of time by preventing the solution from being exposed to the air. On the other hand, the aforementioned inventions have such a drawback in that it is not possible to refill a container with a solution; unless a container happens to be empty when the operator comes to check, he has to either wait for the next visit to replace the container or proceed with replacing the container and disposing of the solution remaining in the replaced container. Therefore, the arts offered by the applicant are difficult to be applied to a case where such a maintenance method is employed.

SUMMARY OF THE INVENTION

In order to solve the above problems, an object of the present invention is primarily to provide a solution feeding apparatus and a solution feeding method which are capable of feeding solution from its container while maintaining precise feeding accuracy to the end of the feeding process. Another object of the invention is to ensure the solution remaining in the container to be completely consumed regardless of the distance by which a tube or the like is inserted into the container. Another object of the invention is to provide a reliable way to detect depletion of the solution and control the pump regardless of whether the pump has a low output rate, wherein detection is registered only when the solution in the container has completely been consumed. Yet another object of the invention is to reliably separate however tiny bubbles from the solution and thereby prevent them from entering the pump. Yet another object of the invention is to prevent the container from being torn even in cases where the container is of a type suitable to be used by being pierced with a tube. Yet another object of the invention is to enable the automatic solution feeding which can container for a long period of time, thereby reducing the task of replacing containers and facilitating the maintenance and management of solution feeding.

In order to attain the above objects, a feature of the invention lies in that a container hermetically containing a solution is made of a high polymer that permits the container to change its shape in accordance with the amount of its content; the container is removably connected to a tube for forming an isolated conduit extending from the container via a pump to the destination to which the solution is fed; said isolated conduit is provided with a gas-liquid separation tank for separating gas from the solution and a gas trap section communicating with the gas-liquid separation tank, the gas-liquid separation tank and the gas trap section located between the container and the pump; and that said gas trap section has a variable volume. The second feature lies in that a desired number of isolated conduits extending via respective pumps to the destination to which the solution is fed are formed by connecting a tube to each container hermetically containing a solution and made of a high polymer that permits the container to change its shape in accordance with the amount of its content; each isolated conduit is provided, at a location between the associated container and the pump, with a gas-liquid separation tank for separating gas from the solution and a gas trap section communicating with the gas-liquid separation tank; and that any one of the isolated conduits may selectively be operated by means of each respective gas detection sensor installed in the corresponding gas trap section. The third feature of the invention lies in that a solution is sealed in container which is made of a high polymer and capable of changing its shape in accordance with the amount of its content; a tube for forming an isolated conduit extending via a pump to the destination to which the solution is fed is connected to said container; said isolated conduit is provided, at a location between the container and the pump, with a gas-liquid separation tank and a gas trap section communicating with the gas-liquid separation tank, said gas liquid separation tank adapted to separate the gas that has entered the conduit from the solution, and the gas trap section adapted to confine therein the gas separated in the gas-liquid separation tank; and that said gas trap section has a variable volume, although the gas-liquid separation tank is ensured to maintain a constant volume until all the solution in the container is consumed.

DETAILED DESCRIPTION OF THE INVENTION

Although the present invention is offered principally as a replenishing device for replenishing an automatic developing apparatus with a photographic processing agent, it is to be understood that the invention has a wide range of usage; it is application to feeding of any solution that is prone to changes in quality when exposed to air or hazardous to health should it come into contact with a hand.

Furthermore, the term "solution" mentioned above or hereunder refers to liquid in general including pure water in which nothing is dissolved. In other words, the present invention is applicable to a case where, for example, it is desired to isolate water from the outside atmosphere for a long period of time and remove it by a given quantity each time whenever it is necessary.

Figure 1:
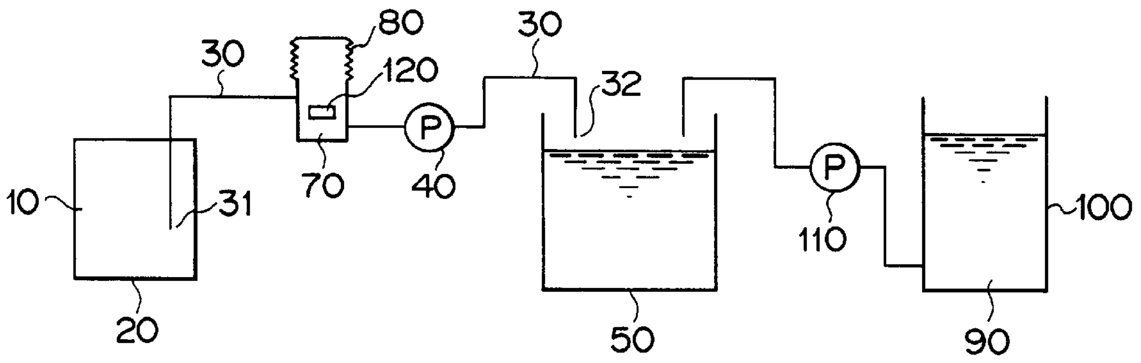
FIG. 1 is a schematic diagram showing the flow of solution according to the invention.

Next, to an embodiment of the present invention is explained in detail hereunder, referring to FIG. 1. Solution 10 used for the present embodiment is available on the market in such a state as to be sealed in a container 20 which is made of a high polymer and capable of changing its form in accordance with the quantity of its content. When the solution 10 is used, the container 20 is pierced with the front end portion 31 of a tube 30 of a solution feeding apparatus according to the invention with the tube 30 thus inserted into the container 20, an airtight conduit isolated from the outside atmosphere and extending from the container 20 to a conduit exit 32 is formed. The conduit exit 32 opens solution feeding destination. Of the isolated conduit mentioned above, the part extending from the container 20 to a pump 40 is an airtight channel. Although the conduit exit 32 located downstream from the pump 40 is open according to the embodiment, it may be provided with an open/close valve if it is desired. Even though the tube is open at the conduit exit 32, the conduit is called the isolated conduit, because the aperture of the conduit exit 32 is small so that only a minimal portion of the solution is in contact with the outside air. By operating the pump 40 in this state, the solution 10 in the container 20 can be fed to a solution feeding destination 50. As the solution in the container.20 is reduced with feeding of the solution 10, the container 20 becomes flattened according to the amount of its content, thereby preventing the solution 10 from being exposed to air to the end of the feeding process. Therefore, even in cases where the invention is employed to replenish a solution for processing a silver halide photographic material or other similar cases where it takes several days to use up the solution in a container, the invention is capable of feeding the solution to the end without the danger of deterioration of the solution.

As a feature of the invention, the portion of the isolated conduit between the tube end portion 31 and the pump 40 is provided with a gas-liquid separation tank 70 for separating gas 60 that has entered the isolated conduit from the solution. A gas trap section 80 that communicates with the gas-liquid separation tank 70 and serves to retain the gas separated from the solution is formed at the upper part of the gas-liquid separation tank 70. When the pump 40 of a solution feeding apparatus according to the invention is actuated, the solution 10 sealed in the container 20 is suctioned from the tube end portion 31 into the gas-liquid separation tank 70, in which the gas 60 that has entered the isolated conduit is separated from the solution. Due to its own buoyancy, the gas rapidly moves into the gas trap section 80 communicating with the gas-liquid separation tank 70 and is retained therein. The solution from which the gas 60 has been removed in the gas-liquid separation tank 70 is fed through the pump 40 to the solution feeding destination 50.

According to the invention, the solution 10 may be fed only when it is necessary by operating the pump 40. Therefore, the amount of the solution 10 to be supplied can be controlled by means of, for example, limiting the duration of each operation of the pump 40. In cases where the solution 10 is desired to be fed in a small quantity each time, fluctuation in quantity of the solution can be reduced by using a pump 40 having a low output rate. Accordingly, in cases where a relatively large quantity of the solution is fed each time, a desired quantity of solution can be fed within a short period of time by using a pump that has a relatively high output rate, of course, it is possible to feed solution continuously instead of feeding it intermittently. In case of continuous feeding, too, the solution feeding rate can be determined as desired by choosing a pump 40 having an appropriate output rate. Furthermore, in cases where a desired number of isolated conduits are provided in a manner described later, each isolated conduit functions in the same manner as above.

In case of a solution which is usually sold in the form of a concentrated liquid and diluted at a specified ratio when used, such as a processing solution for processing a silver halide photographic material, a diluent water tank 100 for reserving the diluent water 90 and a diluent water feeding pump 110 for feeding the diluent water 90 may be provided so that the diluent water 90 can be fed to the solution feeding destination 50 simultaneously with the solution 10 by operating the diluent water feeding pump 110 in sync with the pump 40 that serves to feed the solution 10. By controlling respective strokes of the pumps, the solution 10 can be diluted to a desired concentration without human involvement. In cases where the solution is a product that consists of a plurality of solution parts and has to be prepared by mixing the solution parts at specified mixing ratios and diluting the mixture with water, plurality of isolated conduits in a number corresponding to the number of solution parts may be provided so that the solution parts can respectively be fed with appropriate mixing ratios by controlling operation of their respective pumps 40.

As described above, when feeding a solution which requires dilution or mixing solution parts, the solution parts may be fed directly to the solution feeding destination 50 and mixed together therein, or the apparatus may include an intermediate tank or a separate tank where the exits 32 of all the isolated conduit s and the exit of the conduit for feeding the diluent water are brought together so that the solution parts are mixed together and diluted in the intermediate tank or the separate tank into a solution that is ready for use and then fed to the solution feeding destination.

After all the solution 10 is sucked out of the container 20, the negative pressure in the isolated conduit increases with each operation of the pump 40, and the gas 60 trapped in the gas trap section 80 gradually expands accordingly. The expansion of the gas is detected by a gas detection sensor 120, which then sends out signals to an apparatus control unit to stop the operation of the pump 40. Thus, the apparatus is capable of halting feeding of the solution at the appropriate moment when the solution 10 in the container 20 has completely been consumed while there is no air in the pump 40. The structure may include an alarm which operates in conjunction with halting of the operation of the pump 40 so as to sound a buzzer, light a lamp or otherwise inform the operator that it is necessary to replace the container 20 with a new one.

When replacing an empty container 20 with a new one, the gas in the gas trap section 80 is discharged into the container 20 by means of flattening the gas trap section 80 or otherwise reducing the volume of the gas trap section 80 to the minimum. Thereafter, the tube 30 inserted in the container 20 is removed, and the empty container 20 is disposed of. Then, the tube end portion 31 or the piercing needle attached to the tube is stuck into a new container 20 in which a solution 10 is sealed, and the volume of the gas trap section 80 is increased. As a result, the gas 60 remaining in the isolated conduit is gathered into the gas trap section 80, and the interior of the isolated conduit becomes filled with the solution 10. Thus, the apparatus is reset to the state where it is ready to feed the solution 10.

Even if there is some amount of gas 60 in the container 20 from the beginning, the gas is separated from the solution 10 in the gas-liquid separation tank 70 when the gas is sucked into the isolated conduit together with the solution 10 upon initiation of feeding of the solution. As the gas thus separated from the solution 10 quickly moves into the gas trap section 80,there is no possibility of gas entering the pump 40.

Figure 16:
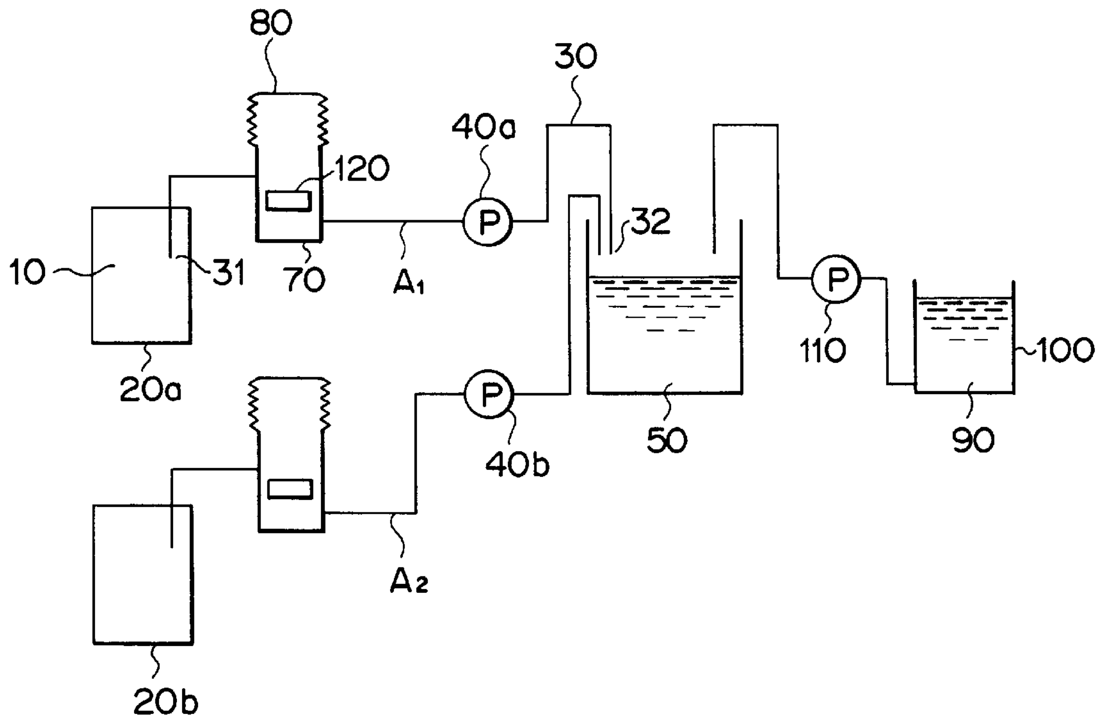
FIG. 16 is a schematic diagram showing the flow of solution according to another embodiment of the invention.

FIG. 16 that represents another embodiment of the present invention is explained hereunder. Elements shown in FIG. 16 are the same as those in FIG. 1 unless specifically described otherwise.

The embodiment shown in FIG. 16 includes a desired number of tubes 30, each of which serves to form a conduit extending from the end portion 31 of the tube 30 through a pump 40 to a solution feeding destination 50, which is common to all the conduits. By respectively connecting the end portions 31 of these tubes 30 in an airtight state to containers 20*a*,20*b*, . . . , each of which seals solution 10 therein, a desired number of isolated conduits A1,A2, . . . are formed. All the containers 20 connected to the isolated conduits A1,A2, . . . contain the same kind of solution 10. The isolated conduits connected to the containers 20 sealing the same kind of solution 10 therein constitute a single set; one set consists of two isolated conduits in the example shown in FIG. 16. In cases where it is used as a replenishing device of an automatic developing apparatus for processing silver halide photographic materials, it is recommendable to provide one set of isolated conduits for each type of processing solutions, such as a developing solution, a bleaching-fixing solution and a chemical rinse. In cases where each processing solution consists of a plurality of solution parts, each solution part is provided with a set of isolated conduits, and each set is controlled separately. The following explanation refers to an example which is provided with a single set of isolated conduits.

As described above, a container 20 is connected to each isolated conduit A1,A2, . . . , of which the portion from the container 20 to the pump 40 is an airtight channel. Although the portion further than the pump 40, i.e. the conduit exit 32, is open according to the embodiment, it may be provided with an open/close valve if it is desired. Even though the tube is open at the conduit exit 32, it presents no problems, because the aperture of the conduit exit 32 is small so that only a minimal portion of the solution is exposed to the outside air. By operating one of the pumps of the isolated conduits A1,A2, . . . , for example the pump 40*a*, in this state, the solution 10 in the container 20*a* is fed to the solution feeding destination 50.

The solution from which the gas 60 has been removed in the gas-liquid separation tank 70 is fed through the pump 40*a* to the solution feeding destination 50.

After all the solution 10 is sucked out of the container 20*a*, the negative pressure in the corresponding isolated conduit increases with each operation of the pump 40*a*, and the gas 60 trapped in the gas trap section 80 of the conduit to which the container 20*a* is connected begins to expand accordingly. A gas detection sensor 120 installed in the conduit detects the expansion of the gas and sends out signals to the apparatus control unit to stop the operation of the pump 40*a* while initiating operation of the pump 40*b*. Thus, the conduit for feeding the solution 10 is changed over from the conduit A1 to the conduit A2 at the appropriate moment when the solution 10 in the container 20*a* has completely been consumed while there is no air in the pump 40*a*.

The structure may include an alarm which operates in conjunction with termination of the operation of the pump 40 so as to sound a buzzer, light a lamp or otherwise inform the operator that the container 20*a* has become empty. In this case, at the moment when the alarm is activated as a result of the container 20*a* having become empty, the solution is being fed from the container 20*b* connected to another conduit, i.e. the conduit A2. Therefore, there is no need to replace the container 20*a* in a hurry; the operator can replace the empty container whenever he has time. In other words, the invention permits the operator to replace a container 20 whenever convenient for him, because replacing a container 20 during the process of feeding solution exerts no influence on the feeding of the solution 10, unless the container 20 belongs to the isolated conduit that is currently used to feed the solution.

According to the invention, it is possible to keep feeding a solution 10 if at least one of the containers 20 of the isolated conduits that constitute a set of isolated conduits still contains the solution 10. Therefore, even in cases where an apparatus according to the invention is used in a self-service photographic laboratory or a similar facility which does not have a permanently stationed operator but, instead, has an operator come once every several days to add replenishment solutions for the processing solutions, it is sufficient merely to increase the number of isolated conduits that constitute each set and attach a new container to each isolated conduit, and, at the time of next visit, replace only the empty containers among the containers attached to the isolated conduits. Thus, together with such a benefit as eliminating the necessity of preparing replenishment solutions at each visit, the invention is capable of substantially increasing the efficiency of patrol. In cases an apparatus is used in such a manner as above, each isolated conduit may conveniently be provided with a lamp which is so designed as to operate in sync with the alarm and be turned on when depletion of the container 20 connected to the corresponding isolated conduit is detected, thereby allowing the operator who has come to the facility on patrol to know at a glance which container should be replaced.

When a solution filling an isolated conduit reaches the gas detection sensor as a result of replacing a container in the manner described later, the gas detection sensor is turned off. At that time, signals for turning off the gas detection sensor may desirably be sent to the apparatus control unit so that in the event where the gas detection sensors of all the isolated conduits of a set of conduits are in the 'on' state, change over to the pump of another conduit is prevented, thereby halting all the pumps. As a result, even if all the containers become empty due to delay in replacing containers, air is prevented from inadvertently entering any one of the pumps 40.

Figure 17:
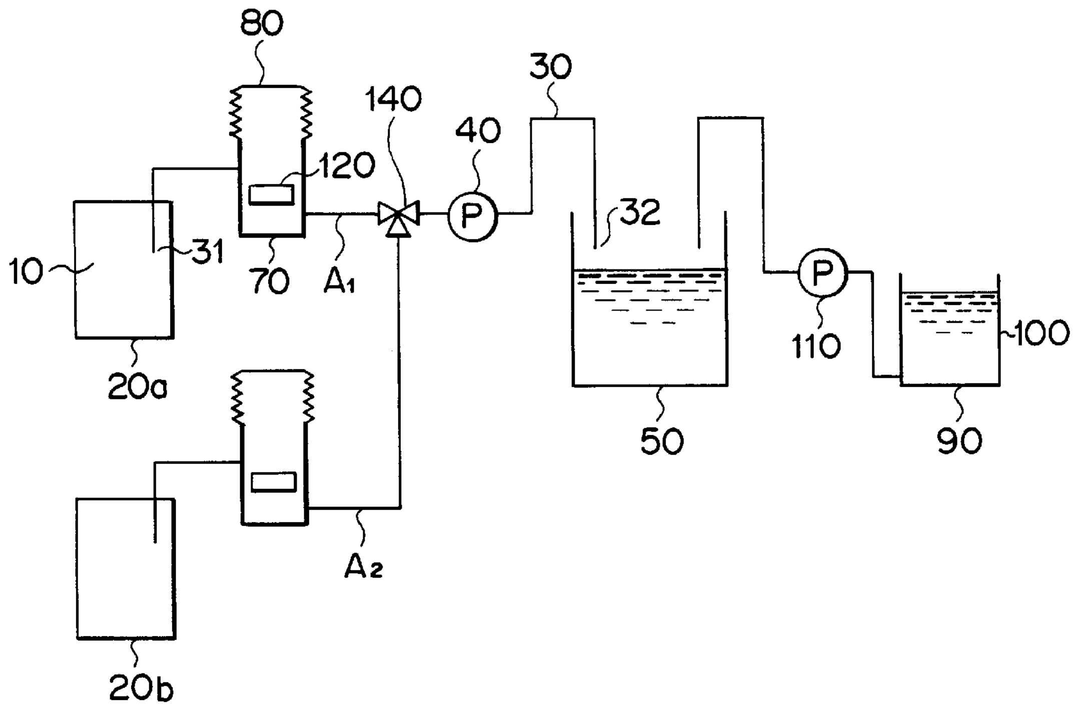
FIG. 17 is a schematic diagram showing the flow of solution according to yet another embodiment of the invention

Next, yet another embodiment of the invention is explained hereunder, referring to FIG. 17, which represents a schematic diagram of said embodiment.

A desired number of tubes 30, to which containers 20 will respectively be connected, are provided. These tubes 30 are integrated into a single conduit through a selector valve 140 installed upstream from a pump 40. Said single conduit extends through the pump 40 to a solution feeding destination 50. By airtightly connecting containers 20*a*,20*b*, . . . , which seal the same kind of solution 10 therein, to the respective tube end portions 31 of the conduit, which is branched into a desired number via the selector valve 140, a desired number of isolated conduits A1,A2, . . . that are connected to a single conduit via the selector valve 140 are formed. Each isolated conduit is provided, at a location between the tube end portion 31 and the selector valve 140, with a gas-liquid separation tank 70 and a gas trap section 80 that communicates with the gas-liquid separation tank 70.

By actuating the pump 40, solution 10 is suctioned from the container connected to one isolated conduit selected by the selector valve 140, e.g. the container 20*a*, and fed to the solution feeding destination 50. At that time, the solution 10 in the containers connected to the other isolated conduits, e.g. the container 20*b* of the isolated conduit A2, is prevented from being suctioned, because all the other isolated conduits are closed by the selector valve 140. After all the solution 10 in the container 20*a* is sucked out of the container, each operation of the pump 40 increases the negative pressure only in the isolated conduit that is opened by the selector valve 140 (for example, the isolated conduit A1 when the solution 10 has been sucked from the container 20*a*), and the gas 60 trapped in the gas trap section 80 of the corresponding isolated conduit starts expanding accordingly. The expansion of the gas is detected by the gas detection sensor 120, which then sends out signals to the apparatus control unit to control the selector valve 140 so as to close the isolated conduit A1 and open another isolated conduit, e.g. the isolated conduit A2. Thus, the source of feeding the solution 10 is changed over to another container, e.g. the container 20*b*, at the appropriate moment when the solution 10 in the container 20*a* has completely been consumed while there is no possibility of air entering any pump 40. The structure may include an alarm which operates in conjunction with termination of the operation of the pump 40 so as to sound a buzzer, light a lamp or otherwise inform the operator that it is necessary to replace the container 20*a* with a new one.

As empty containers can be replaced, in the same manner as that of the embodiment described above referring to FIG. 16, without exerting any influence on the conduit that is currently used for feeding solution, they can be changed all at once whenever convenient for the operator. The embodiment shown in FIG. 17 has a benefit in that a whole apparatus can be made compact, because a single pump is sufficient for feeding one kind of solution regardless of the number of containers, in other words regardless of the number of isolated conduits into which the conduit for the solution is branched via the selector valve 140.

A solenoid valve that operates in accordance with the number of conduits selected may be used as the selector valve 140 used in a solution feeding apparatus according to the invention. The functions of the embodiment shown in FIG. 17 of the invention that are not mentioned in the above explanation are the same as those of the embodiment shown in FIG. 16.

Figure 18:
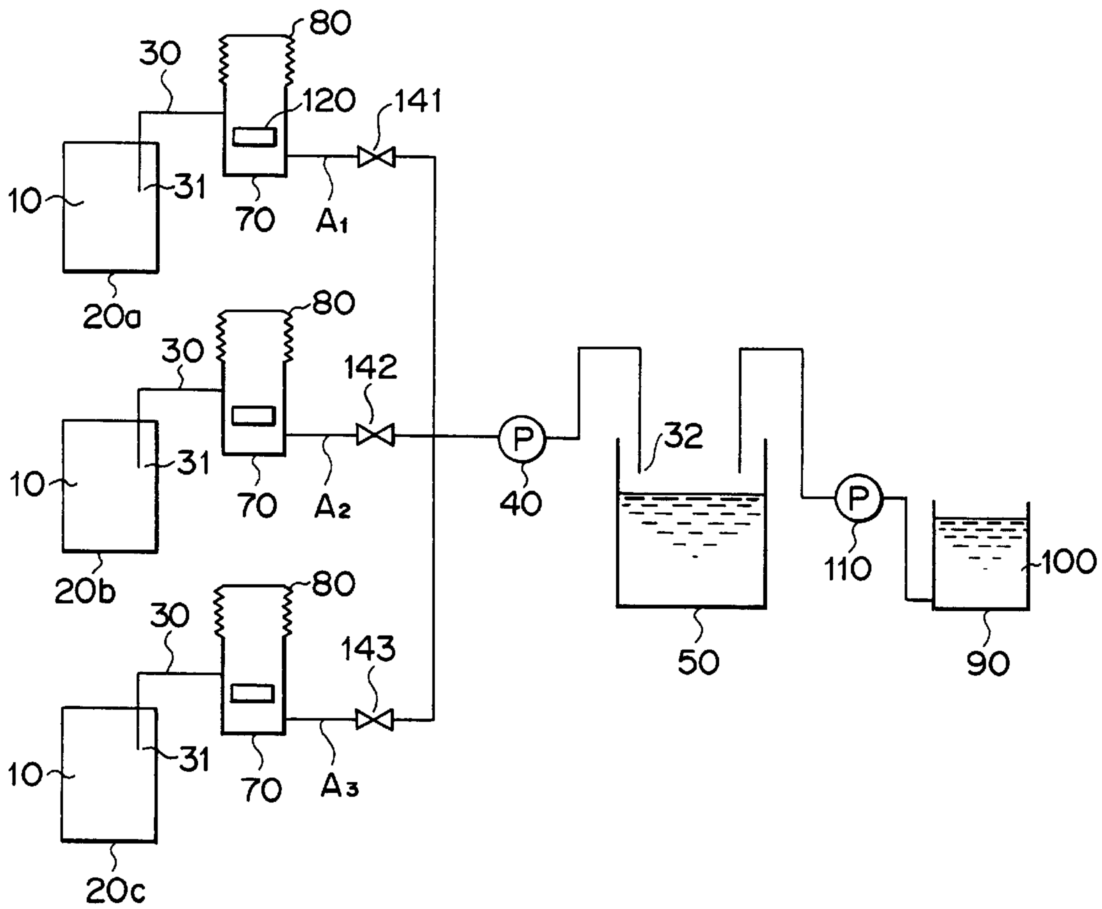
FIG. 18 is a schematic diagram showing the flow of solution according to yet another embodiment of the invention.

Next, yet another embodiment of the invention is explained hereunder, referring to FIG. 18.

The present embodiment includes a desired number of tubes 30, to which containers 20 will respectively be connected. The tubes 30 are respectively provided with open/close valves 141,142,143, . . . and integrated into a single conduit at a point downstream from the valves. From there, the conduit further extends via a pump to the solution feeding destination 50. By airtightly connecting containers 20*a*,20*b*, . . . , which seal the same kind of solution 10 therein, to the respective tube end portions 31 of the conduit, which is branched into a desired number at a point upstream with respect to the pump 40, a desired number of isolated conduits A1,A2, . . . that are integrated into a single conduit at a point between the valves 141,142,143, . . . and the pump 40 are formed. Each isolated conduit is provided with a gas-liquid separation tank 70 and a gas trap section 80 that communicates with the gas-liquid separation tank 70, at a location between the tube end portion 31 and each respective valve 141,142,143, . . . . By actuating the pump 40, the solution 10 alone in one of the containers 20, i.e. the container connected to the valve that has been selected from among the valves 141,142,143, . . . and opened, is fed to the solution feeding destination. When the depletion of the container is detected through the same mechanism as that of the embodiment shown in FIG. 17, signals from the apparatus control unit closes the valve while simultaneously opening the valve of another conduit, thereby switching over the route of feeding the solution. Thus, the solution can be fed continuously. The other elements are the same as the embodiment shown in FIG. 17. An apparatus according to this embodiment has a very simple structure and presents various benefits in that it is easy to conduct maintenance and inspection and can be put on the market at a low price.

As it is evident from the above explanation, a solution feeding apparatus and a method of feeding solution according to the invention calls for forming an isolated conduit that is isolated from the outside air by sticking a tube 30, which serves to form said conduit, into a container 20 containing a solution 10 in an airtight state. Therefore, the apparatus and the method of the invention are free from the problem of gas getting from the outside into the isolated conduit after the container is attached to the conduit. According to the invention, the amount of gas 60 that may get into an isolated conduit is limited to the amount of the gas existing in a container 20 from the beginning, and also the gas that remains in an isolated conduit or enters the conduit anew when the container 20 that is attached to the isolated conduit and has become empty of the solution 10 is replaced with a new container that is filled with the solution 10.

The term "the amount of the gas existing in a container 20 from the beginning" mentioned in the above paragraph refers to the amount of gas that entered a container 20 when the container 20 was produced with a solution 10 sealed in the container 20. Although it may depend on the method of sealing solution 10 in a container 20, the amount of gas inadvertently entering the container can be controlled by means of a sealing method known to those skilled in the art; the volume of gas is usually limited to no more than 6% of the volume of the container 20. Of course, it is desirable to limit the amount of gas entering a container 20 to a minimum. Some widely known methods offer relatively easy ways to control the percentage of gas in a container 20 to 0%, in other words produce a container completely devoid of gas. In cases where no gas is contained in the container 20, the invention functions precisely, with no problem at all. In some cases, inert gas, such as nitrogen gas or the like, is deliberately sealed in a container 20 in order to prevent deterioration of the solution 10. In such cases, too, the present invention functions without any problem.

The aforementioned term "gas that remains in an isolated conduit or enters anew when the container 20 is replaced" refers to the gas that fails to be discharged during the operation of discharging the gas in a gas trap section 80 and consequently remains in the corresponding isolated conduit, and a small quantity of gas enters the isolated conduit during a series of operations conducted to replace a container 20. The maximum total amount of such gases corresponds to the internal volume of the portion of an isolated conduit from its tube end portion 31, which pierces a container 20, to the gas detection sensor 120 at the moment when the volume of the gas trap section 80 is reduced to its minimum. The structure of the present invention ensures that no greater amount of gas enters a conduit during replacement of a container 20.

The amount of gas that may enter the system is not enough to exert any influence on the quality of the solution 10. Should gas enter a pump 40, however, it will impair the accuracy of feeding the solution 10. By using this small amount of gas 60 to detect whether the container 20 is empty, the invention is capable of reliably preventing the gas 60 from entering a pump 40.

Next, each element and component of the invention is explained in detail. As each gas trap section according to the invention has a variable volume, when an empty container 20 is replaced with a new container 20 filled with a solution, the gas 60 in the gas trap section 80 is discharged by reducing the volume of the gas trap section 80 to its minimum. Providing a gas trap section 80 having a variable volume with a securing means to cause the gas trap section 80 to maintain a constant volume ensures the accurate detection of expansion of the gas 60, because such a structure prevents the aforementioned negative pressure from shrinking or flattening the gas trap section 80 after all the solution 10 in the container 20 is suctioned out.

There are many examples of structures provide a gas trap section having a variable volume, including a bellows structure 81, a piston structure, a structure which allows the section to be flattened by hand, and so forth, and any appropriate structure may be employed. A bellows structure 81 is especially convenient in that bellows which are made of a high polymer, such as polyethylene or polypropylene, and available on the market as parts can be used. Among various bellows that are commercially available, exceedingly soft products are difficult to maintain a constant volume when negative pressure is generated in an isolated conduit. For this reason, products having sufficient hardness are desirable, of which polypropylene bellows are especially suitable.

Figure 7:
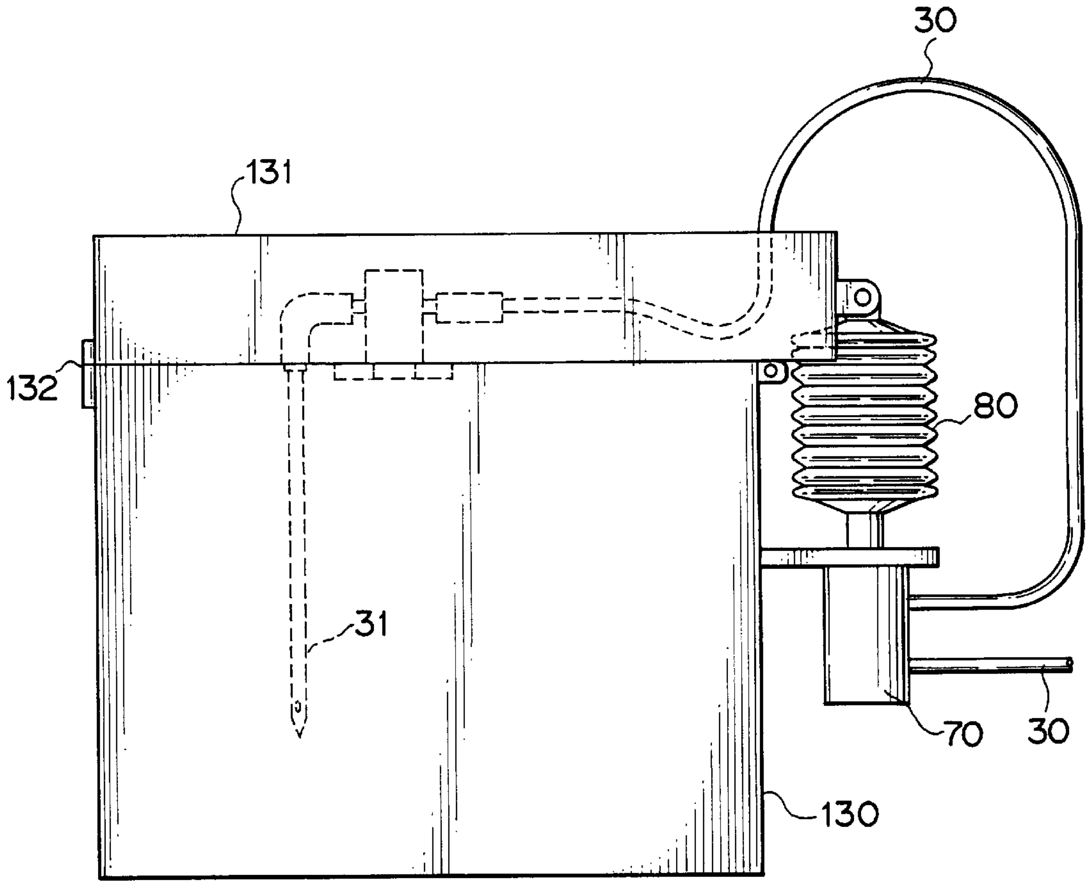
FIG. 7 is a side view of an embodiment of a means to fasten a gas trap section according to the invention.
Figure 8:
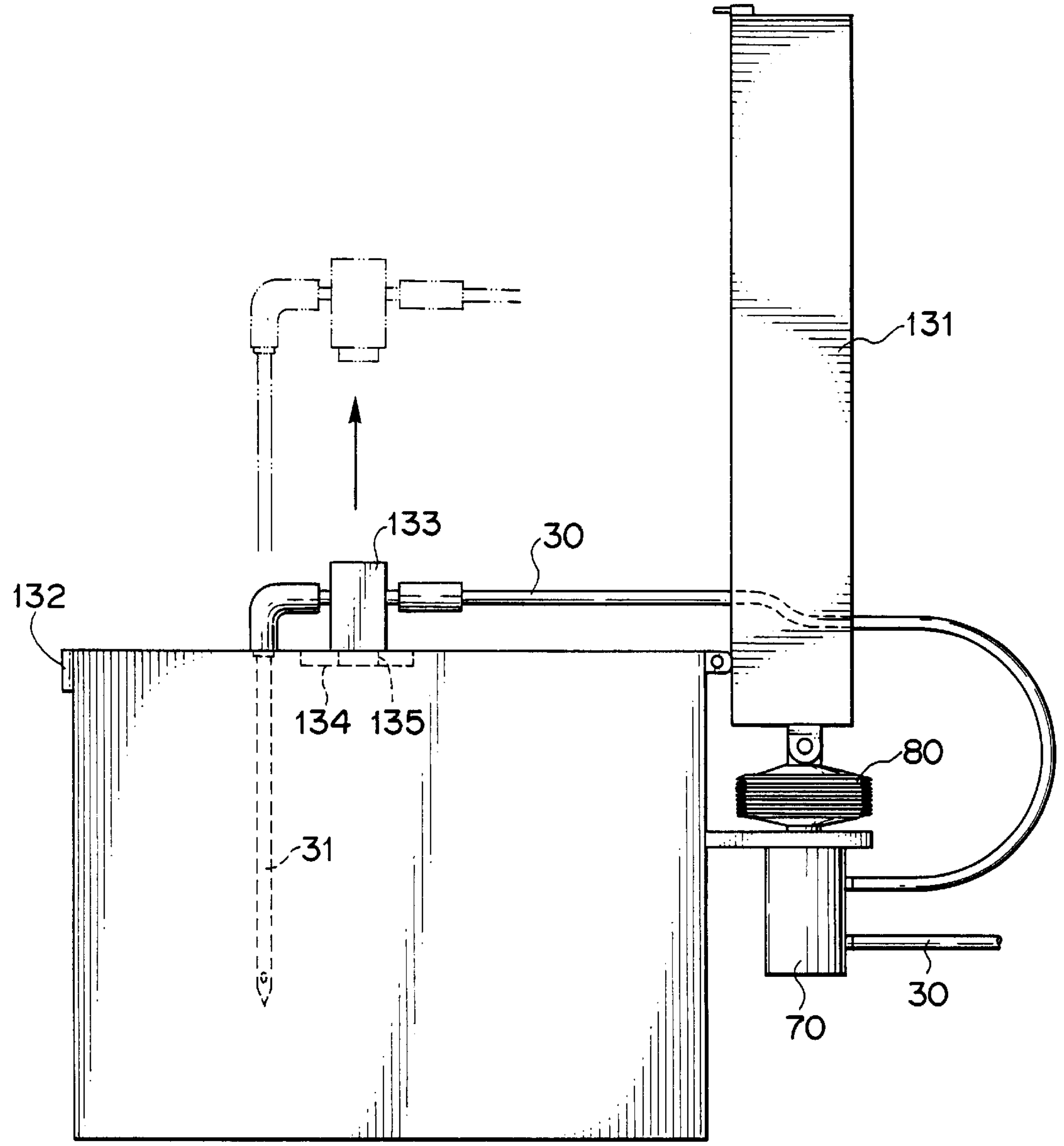
FIG. 8 is another side view of said embodiment of a means to fasten a gas trap section according to the invention.

A particularly desirable means to permit the gas trap section 80 to maintain a constant volume calls for securing the gas trap section 80 while suspending it at the upper part. Examples of such structures include one that calls for suspending it from above with a hook, and another that calls for attaching an iron plate to the top of a gas trap section 80 and suspending it with a magnet disposed above the gas trap section 80. Another desirable example is shown in FIGS. 7 and 8, wherein a gas-liquid separation tank 70 and a gas trap section 80 are installed behind an outer casing 130 which is made of vinyl chloride or the like and serves to contain a container 20 in such a state that the upper part of the gas trap section 80 is fastened to the lid 131 of the outer casing 130. In this case, when replacing a container 20 that has become empty of the solution 10, opening the lid 131 of the outer casing 130 causes the lid 131 of the outer casing 130 to flatten the gas trap section 80, thereby discharging the gas 60 from the gas trap section 80 through the tube end portion 31 into the empty container 20. Thereafter, the tube 30 is removed from the container 20, and the empty container 20 is then disposed of. Then, by sticking the tube 30 into a new container 20 and closing the lid 131 of the outer casing 130, the gas trap section 80 is elongated, with is volume increased, so that the solution 10 is sucked into the isolated conduit to fill the same. By means of a fastener 132 for fastening the outer casing 130 and the lid 131 together, the gas trap section 80 is ensured to keep the current volume until the outer casing 130 is opened again. Such a structure enables the changing of the volume of the gas trap section by means of opening or closing the lid 131 of the outer casing 130 when the container 20 contained therein is replaced. As the above structure calls for removing the tube 30 from the container 20 always after the gas trap section 80 is flattened, it prevents the solution from accidentally splashing and contaminating the surroundings when the gas trap section 80 is flattened. Furthermore, as the above structure calls for returning the volume of the gas trap section 80 to the original state always after sticking the tube 30 into a new container 20 placed in the outer casing 130, it is capable of minimizing the amount of gas entering into the isolated conduit during replacement of a container 20. The tube 30 may be fastened to the interior of the outer casing 130 by means of, for example, removably inserting a fastening block 133 for fastening the tube 30 into a through hole 135 of a plate member 134 attached to the outer casing 130.

The volume of the gas trap section 80 can easily be determined by the volume of gas that is possible to enter the isolated conduit; as described above, the amount of gas 60 that may get into an isolated conduit according to the invention is limited to the gas existing in a container 20 from the beginning plus the gas that remains in an isolated conduit or enters anew when the container 20 that is attached to the isolated conduit and has become empty, with all the solution 10 therein having been removed, is replaced with a new container filled with the solution 10. Therefore, when the gas trap section 80 is maintained to have a constant volume, said constant volume has to be such that it enables the gas trap section 80 to trap the gas that may have entered the container 20 when the container 20 was produced with a solution 10 sealed therein in addition to gas having a volume equivalent to the internal volume of the portion of the isolated conduit from its tube end portion 31 to the gas detection sensor 120 at the moment when the volume of the gas trap section 80 is reduced to its minimum. The volume of the gas that may have entered the container 20 when the container 20 was produced can be determined depending on the method of sealing the solution and controlled as a part of the product specifications.

Figure 2:
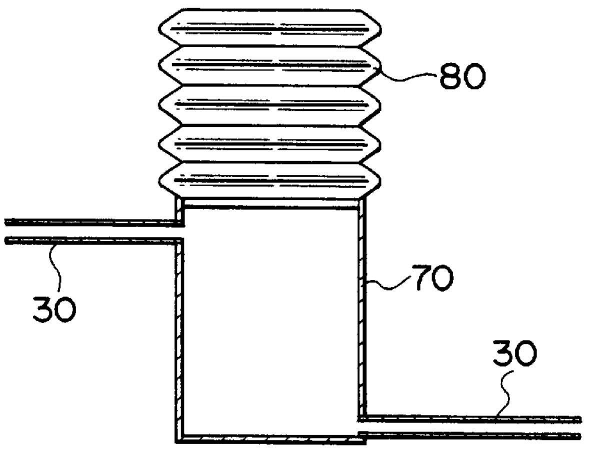
FIG. 2 is a side view of an embodiment of a gas trap section used for the invention, a part of which is shown in a vertical section.

The gas trap section 80 is located on top of the gas-liquid separation tank 70 in such a manner as to communicate therewith. It is desirable that the gas trap section 80 and the gas-liquid separation tank 70 are integrated as shown in FIG. 2. By setting the inner diameter of the portion where the gas trap section and the gas-liquid separation tank 70 are joined together and the inner diameter of the gas-liquid separation tank 70 to more than 8 mm, gas 60 having entered the gas-liquid separation tank 70 can be separated from the solution 10 and quickly moved into the gas trap section 80. Should the inner diameter of the gas-liquid separation tank 70 be less than 8 mm, the surface tension of the solution exceeds the buoyancy of the gas 60, causing the gas 60 to attach itself to the gas-liquid separation tank 70 and thus become impossible to be separated from the solution 10. As a result, the gas 60 is allowed to flow into the pump 40 together with the solution 10. Should the inner diameter of the portion where the gas trap section and the gas-liquid separation tank 70 are joined together be less than 8 mm, the gas 60 separated from the solution 10 is prevented from moving into the gas trap section 80 and therefore forced to remain in the gas-liquid separation tank 70, increasing the possibility of erroneous activation of the gas detection sensor 120. In cases where a commercially available bellows, of which the inner diameter of the narrowest portion is usually less than 8 mm, is used as a gas trap section 80, it is necessary to enlarge such a portion until the inner diameter exceeds 8 mm.

For the reasons described above, the gas-liquid separation tank 70 should desirably have a sufficiently great inner diameter. On the other hand, the larger the inner diameter of the gas-liquid separation tank 70, the greater the possibility of erroneous activation of the gas detection sensor 120 when the gas 60 expands. Therefore, it is particularly desirable to limit the inner diameter of the gas-liquid separation tank 70 in the range of 20 mm to 40 mm. The gas-liquid separation tank 70 may have any desired shape, examples of which include a cylinder, a prism, and so forth.

Figure 3:
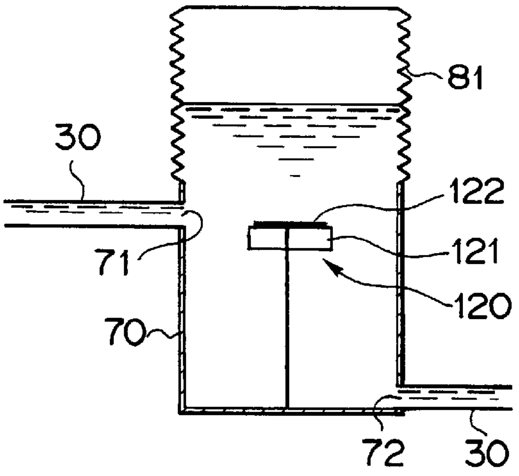
FIG. 3 is a schematic sectional view of a part of the apparatus for illustrating how said gas trap section is used.
Figure 4:
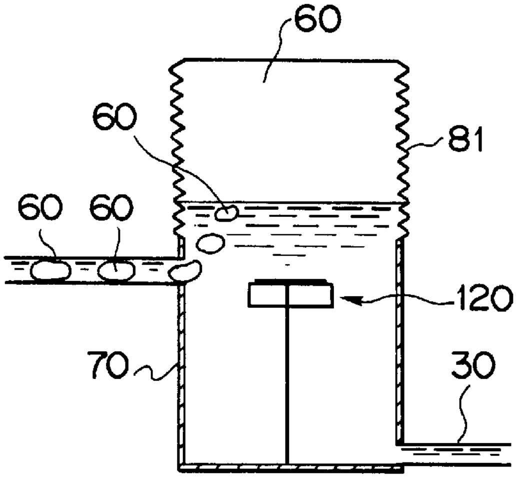
FIG. 4 is a schematic illustration of said gas trap section showing a state where it is in operation.
Figure 5:
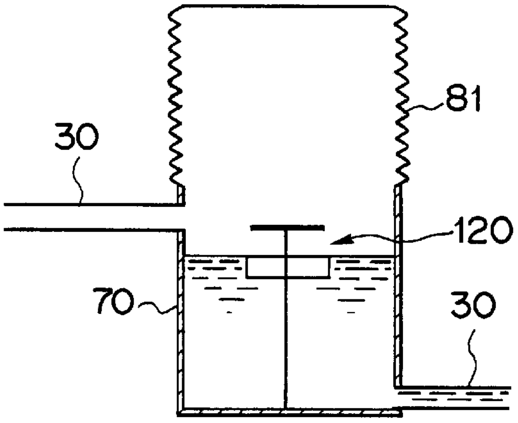
FIG. 5 is a schematic illustration of said gas trap section showing a state where it is in operation.
Figure 6:
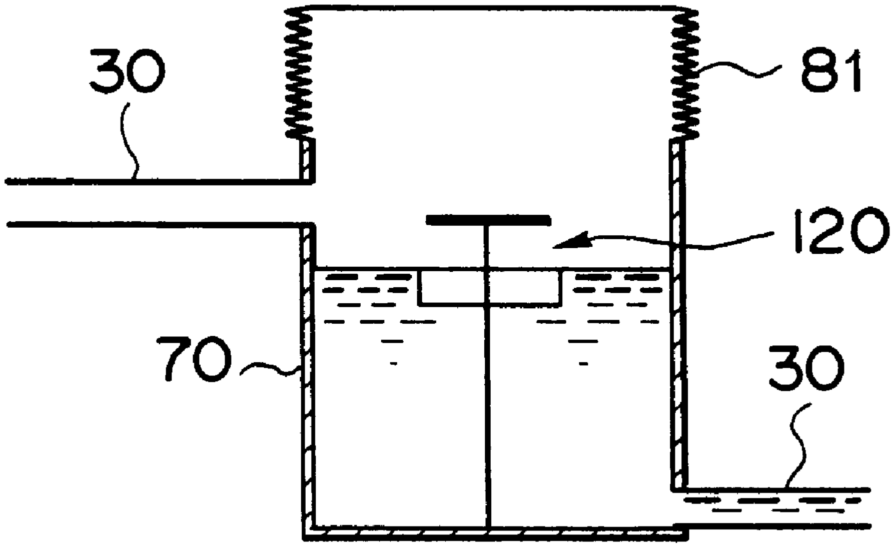
FIG. 6 is a schematic illustration of said gas trap section showing a state where it is in operation.

As shown in FIG. 3, the gas-liquid separation tank 70 is provided with a solution inlet 71 and a solution outlet 72, wherein the solution inlet 71, which permits solution to flow into the gas-liquid separation tank 70 during feeding of the solution, is located higher than the solution outlet 72, which permits the solution to flow out of the gas-liquid separation tank 70, and a gas detection sensor 120 is installed in the gas-liquid separation tank 70, at a location between the solution inlet 71 and the solution outlet 72. The structure described above ensures the downstream portion of the isolated conduit with respect to the point between the solution inlet 71 and the solution outlet 72 in the gas-liquid separation tank 70, i.e. the location where the gas detection sensor 120 is installed, to be filled with the solution when an empty container 20 is replaced with a new container 20. As a result, when the gas 60 in the gas trap section 80 is discharged, the gas 60 is ensured to be discharged in the direction of the container 20, because the solution filling the isolated conduit provides resistance. Thus, such a structure reliably prevents gas 60 from inadvertently entering the pump 40 when the gas is discharged.

The gas detection sensor 120 is installed in such a manner as to detect the gas when the gas 60 trapped in the gas trap section 80 expands 1.1 to 9.5 times its original volume. Should the lower detectable limit for the gas detection sensor 120 to detect expansion of gas 60 be set below 1.1 times the initial volume, an accident, such as contamination of a human body or equipment in the surroundings, may occur during replacement of a container 20, particularly in a case where the tube end portion 31 is not inserted sufficiently deep in the container 20. This is because the gas detection sensor will be activated before the solution is completely removed from the container 20. "A case where the tube end portion 31 is not inserted sufficiently deep in the container 20" mentioned above refers to a situation where the tube end portion 31 has not properly been inserted into the container 20 so that the tube end portion 31 is not close enough to the bottom of the container 20. In such a case, it is inevitable that the gas having entered the container 20 is sucked into the isolated conduit while there still remains some solution 10 in the container 20. Therefore, in cases where the gas detection sensor 120 is so set as to be activated when a prespecified quantity of gas has entered, the detection sensor 120 will be activated even if there is some amount of solution 10 remaining in the container 20. By arranging the gas detection sensor 120 so as to be activated when the gas 60 trapped in the gas trap section 80 expands to at least 1.1 times the initial volume, the gas detection sensor 120 is prevented from being activated even if the amount of gas having entered the isolated conduit reaches a prespecified level, except in a situation where the solution 10 in the container 20 is completely be consumed so that the resulting negative pressure in the isolated conduit causes the gas to expand. Thus, the quantity of the solution allowed to remain in the container 20 can be limited to no greater than 1% of the volume of the container 20.

Arranging the gas detection sensor 120 so as to not be activated before the gas 60 in the gas trap section 80 expands 9.5 times the initial volume often causes the gas detection sensor 120 to fail to be activated in cases where a pump 40 has a low output rate, because such a pump is often unable to produce a sufficiently high negative pressure in the isolated conduit and therefore fails to permit the gas 60 to expand to reach the location where the gas detection sensor is installed. As the alarm to be sounded when the container 20 becomes empty of solution 10 is not activated in such an event, the operator is unable to know when the container 20 should be replaced, sometimes resulting in such a situation that feeding of the solution is suspended for a while. In cases where the invention is used as a replenishing device of an automatic developing apparatus for processing silver halide photographic materials, failure in feeding a replenishment solution at the precise moment due to a situation described above may cause changes in compositions of processing solutions in the processing solution tank of the automatic developing apparatus, resulting in serious damage. By arranging the gas detection sensor 120 so as to be activated before the gas 60 trapped in the gas trap section 80 expands more than 9.5 times the initial volume, the sensor is ensured to accurately detect that the container 20 has become empty of solution 10, even if the pump 40 has an output rate as low as 25 ml/min. or less.

The problem described above can be solved by using a pump having a high output rate. However, a pump having a high output rate naturally discharges a greater quantity of solution with each stroke and increases fluctuation in quantity of the solution fed at a time accordingly, in cases where it is desired to feed solution a little amount at a time. Using a structure such as the one offered by the invention enables the accurate detection of depletion of the solution in the container.

Figure 9:
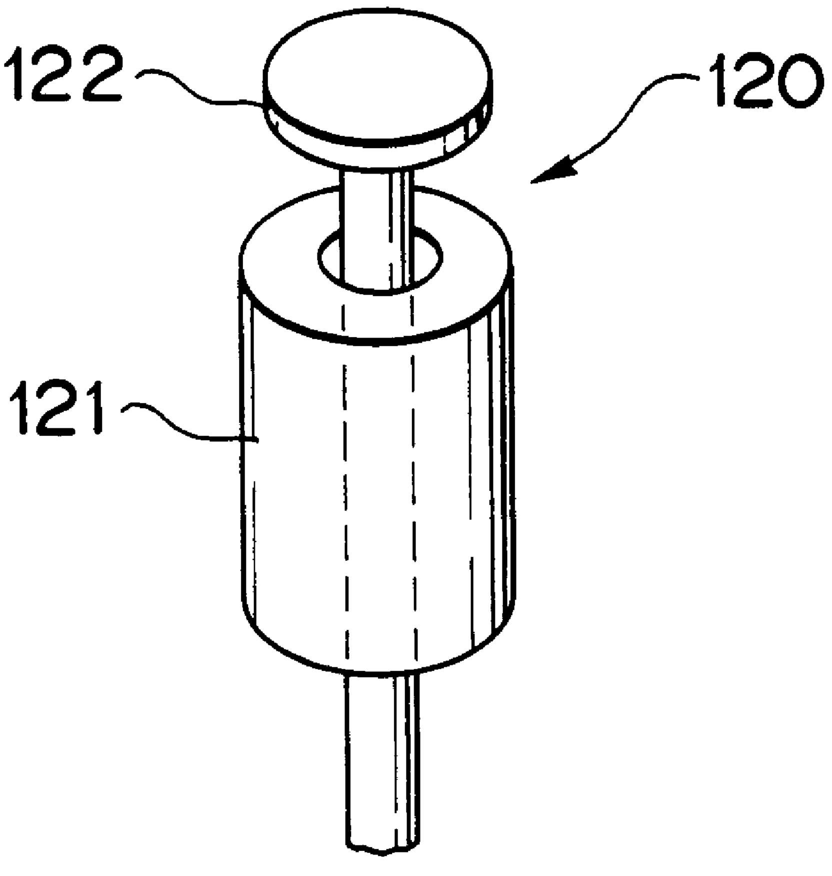
FIG. 9 is a perspective of an embodiment of a gas detection sensor which constitutes a part of the invention.

The gas detection sensor 120 may be of any type on condition that it is capable of detecting gas. Examples of applicable sensors include a float sensor, a photoelectric sensor, a photomicro sensor and so forth. FIG. 9 represents an example of float sensors used as a gas detection sensor 120. The exemplary gas detection sensor 120 shown in FIG. 9 consists of a float 121 and a sensor unit 122. A float sensor of this type has a configuration such that the float 121 and the sensor unit 122 are in contact with each other due to the buoyancy of the float 121 when the portion of the interior of the isolated conduit where the gas detection sensor 120 is disposed is filled with a solution and that the float 121 is removed from the sensor unit 122 upon gas 60 reaching the location of the gas detection sensor 120. As a result of the float 121 being removed from the sensor unit 122, signals are sent to the control unit to stop the pump 40 and activate the alarm.

The tube 30 may desirably be resistant to chemicals and formed of such a material as vinyl chloride, polyethylene, silicone, TEFLON (polytetrafluoroethylene), metal or the like. A tube made of soft polyvinyl chloride (PVC) is particularly preferable because of its superior impermeability to gas and an appropriate hardness to facilitate operation of tube-arranging. The inner diameter of the tube 30 may desirably be limited to less than 8 mm. By limiting the inner diameter to less than 8 mm, a human body or equipment in the surroundings can be protected from contamination by solution 10, which may otherwise occur by the solution 10 accidentally spilling from the tube 30 when the tube 30 is removed from the container 20. However, a tube having an exceedingly small inner diameter imposes a heavier load onto the pump 40 and is therefore not desirable. Therefore, a tube having an inner diameter in the range of 3 mm to 6 mm is especially desirable.

The container 20 and the tube 30 may be connected together by any desired method provided that it is free from the possibility of the outside air entering the system from the connecting point and impairing the airtight capability. However, a method which calls for piercing the container with the tube, thereby inserting the tube directly into the container, is particularly convenient and therefore desirable.

The tube end portion 31 may desirably has such a shape and hardness as to easily pierce the container 20 therewith. For this purpose, the tube end portion 31 itself may be processed, or an appropriately processed piercing needle may be attached to the tube end portion 31. The tube end is desired to have a pointed or angled shape so as to facilitate piercing operation. However, an angled tube end portion 31 formed merely by diagonally cutting the end of the tube tends to tear the container 20 when piercing the container 20. Should the container 20 be torn, it becomes difficult to keep the system airtight, because the outside air is permitted to enter the container 20 more easily. Such an accident tends to occur particularly in cases where a part of the container 20 is made a material having a great tensile strength, such as PET or vinylidene chloride. Furthermore, a solution intake opening formed at the tip of the tube is prone to a problem such that the inner wall of the container 20 comes into close contact with the solution intake opening and prevents the solution 10 from being sucked into the tube when the quantity of solution 10 in the container 20 is reduced.

Figure 10:
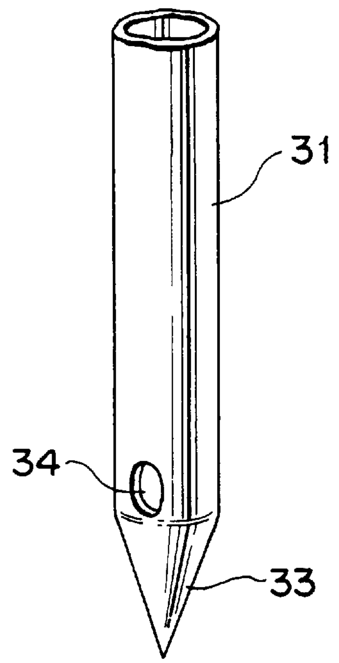
FIG. 10 is a perspective of an embodiment of a tube end or a needle used for the invention.
Figure 11:
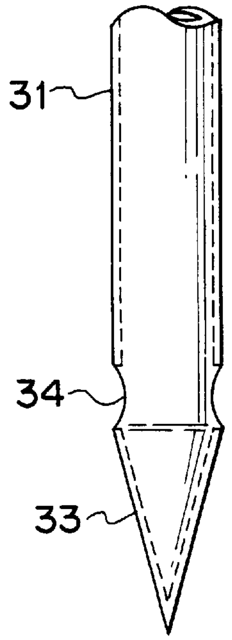
FIG. 11 is a sectional view of said embodiment of a tube end or a needle used for the invention.

An exemplary shape of the tube end portion 31 or a needle to be attached to the tube end portion 31 is shown in FIGS. 10 and 11. The embodiment shown in these figures has a conical end 33 and a solution intake opening 34, which is bored in the wall of the end portion 31, at a distance from the conical end 33. By thus forming the end into a conical shape 33, the container 20 is prevented from being torn when pierced with the end portion 31. As the solution intake opening 34 is not formed at the tip but in the wall of the end portion 31, at a distance from the tip, the embodiment ensures the solution 10 to be properly suctioned by preventing the inner wall of the container 20 from coming into close contact with the solution intake opening 34. A tube end particularly effective in preventing the problem of the container 20 from being attached to the solution intake opening can be provided by a structure which calls for a plurality of solution intake openings 34 (for example 2 to 4 solution intake openings) instead of providing only a single solution intake opening 34, or a structure such that the diameter of the tube or the needle is reduced only at one point, where a solution intake opening or solution intake openings 34 are formed. Any material which has an appropriate hardness and can be processed may be used for the aforementioned needle. Particularly desirable examples of such materials include various metals, such as stainless steel (SUS) and titanium, in addition to vinyl chloride.

It is desirable to roughly polish the tube end portion 31 or the equivalent member to pierce a container 20 with. In cases where a container suitable to be pierced (such a container will be explained later) is used, polishing its surface completely like mirror finish causes the container 20 to stretch and become attached to the end of the tube, making it difficult to pierce and more prone to being torn and losing its airtight capability. Therefore, it is desirable to leave the tube end portion 31 or the equivalent member in a roughly polished state instead of completely polishing it when it undergoes a shaping process. Polishing the tube end portion in the manner described above ensures the smooth piercing of the container 20 and prevents breakage of the container 20.

Figure 12:
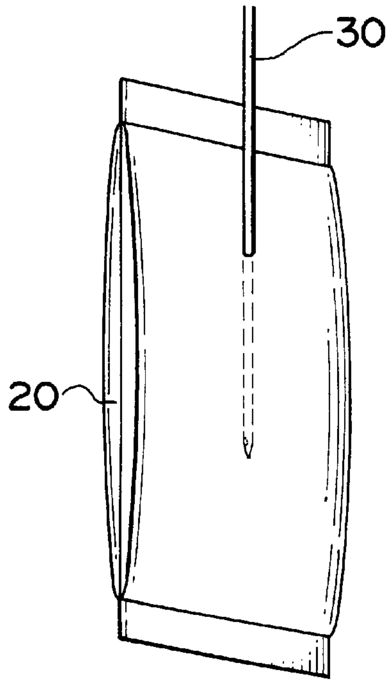
FIG. 12 is a perspective of an embodiment of a container used for the invention, showing the container in the state where it is in use.
Figure 13:
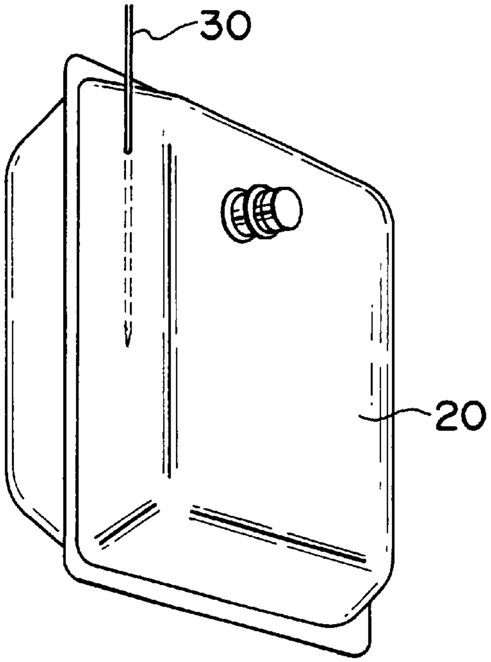
FIG. 13 is a perspective of another embodiment of a container used for the invention, showing the container in the state where it is in use.
Figure 14:
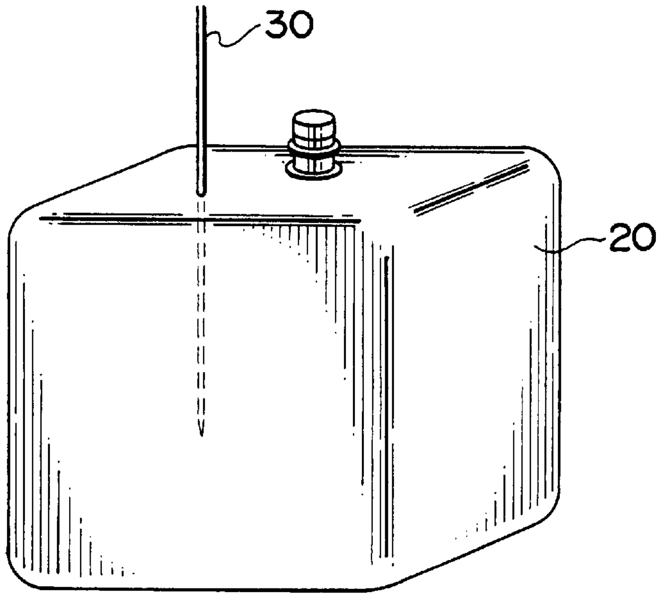
FIG. 14 is a perspective of yet another embodiment of a container used for the invention, showing the container in the state where it is in use.
Figure 15:
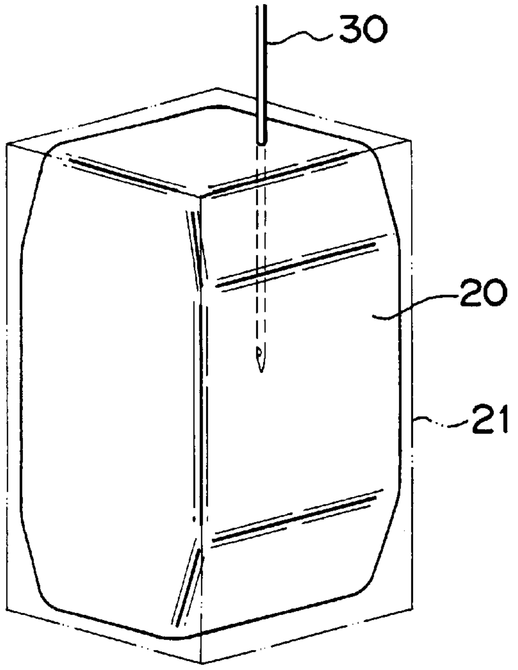
FIG. 15 is a perspective of yet another embodiment of a container used for the invention, showing the container in the state where it is in use.

Each container 20 used for the present invention is made of a high polymer and capable of changing its shape in accordance with the amount of its content. Examples of containers that are capable of changing their shapes in accordance with the amount of their respective contents include one shown in FIG. 12, which represents a cylindrical member having sealed upper and lower ends; another shown in FIG. 13, wherein two pieces of cloth are placed one on top of the other and sealed along the four side edges, and an opening is formed at a part of one of the pieces of cloth; and yet another shown in FIG. 14, which represents a cube-shaped container provided with an opening. As any one of these containers gradually looses the ability to stand on itself with decrease in the amount of solution contained therein, the container may be placed in a cardboard box 21 or the like as shown in FIG. 15 so that the tube 30 may be stuck into the container 20 from the outside the cardboard box 21.

With regard to the method of connecting the container 20 and the tube 30, a method which calls for piercing the container 20 with the tube 30, thereby inserting the tube into the container, is conveniently simple and therefore desirable. In order to employ this method, at least one layer of the container 20 may desirably be formed of a high polymer film having a low tensile strength. Examples of high polymers having a low tensile strength include polyolefine-based resin, such as polyethylene, unextended nylon, cellulose acetate, polyvinyl acetate, and ionomers, of which polyolefine-based resin is particularly preferable because of its superior heat insulating ability manifested during molding of the container, and such other benefit that the molded container is not prone to breakage when being transported. Among typical examples of polyolefine-based resins are PE (polyethylene) and LLDPE (linear low-density polyethylene). The ability of the container 20 to shut out gas can be increased by forming the container 20 with a multiple-layer film by means of laminating either one of or both sides of such a high polymer film having a low tensile strength with a film having a great tensile strength, examples of which include ethylene-vinyl alcohol copolymer resin, such as EVAL, polyethylene terephthalate, extended nylon, vinylidene chloride, polystyrene, ceramics and aluminum.

The structure of particularly desirable examples of a multi-layered film used to form a container 20 of the invention are listed in the following, wherein each respective combination represents layers from the outermost layer to the innermost layer:

(1) Ny (extended nylon)/LLDPE (linear low-density polyethylene)

(2) Ny/PVDC (polyvinylidene chloride)/LLDPE (3) Ny/$SiO_x$/LLDPE (4) Ny/EvOH (EVAL)/LLDPE (5) PET (polyethylene terephthalate)/LLDPE (6) PET/PVCD/LLDPE (7) PET/PVCD/LLDPE In cases where a container 20 formed of a multi-layered film having any one of the above structures is used for the method that calls for piercing a container 20 with a tube 30 to insert the tube into the container, no such problems as solution leaking from the portion where the container 20 has been pierced or gas entering from the said portion and impairing the airtight capability of the system will arise.

Each container 20 used for the invention may have a film thickness ranging from 50 $\mu$m to 300 $\mu$m and an oxygen permeability of no more than 100 ml/$m^2$ per day in an environment of 1 atm., 20° C. and 60% RH. A container 20 which satisfies these criteria has characteristics suitable to be pierced and a superior impermeability to gas and is not easily broken when it is stored for a long period of time or exposed to vibration during transportation.

EFFECT OF THE INVENTION

As described above, a container hermetically containing a solution is made of a high polymer that permits the container to change its shape in accordance with the amount of its content; the container is removably connected to a tube for forming an isolated conduit extending from the container via a pump to the destination to which the solution is fed; said isolated conduit is provided with a gas-liquid separation tank for separating gas from the solution and a gas trap section communicating with the gas-liquid separation tank, the gas-liquid separation tank and the gas trap section located between the container and the pump; and said gas trap section has a variable volume. Therefore, the above structure enables the automation of such processes as dilution of a solution and mixing of a plurality of solution parts without exposing the solution sealed in the container to the outside atmosphere and consequently prevents an error in adjusting a processing solution and protects a human body and surrounding equipment from contamination that me otherwise occur by touching the solution. Furthermore, by reliably preventing erroneous activation of a gas detection sensor, the above invention is ensured of having a capability of informing of depletion of the solution in the container. As it reliably prevents gas from entering the pump, the invention is capable of feeding a solution while precisely maintaining a desired feeding rate to the end of the feeding process, furthermore, as the invention is capable of reducing the solution remaining in the container to an extremely small quantity, it is capable of preventing the solution remaining in the container from contaminating a human body or surrounding equipment when the container is disposed of.

The invention provides a container having a great ability to shut out gas by preventing leakage of solution when the container is pierced with a tube.

As the present invention includes a fastening means for maintaining a constant volume in the gas trap section, negative pressure is generated in the isolated conduit after all the solution in the container is suctioned out of the container. Therefore, the invention prevents failure in accurate detection of expansion of gas, which may otherwise occur as a result of the gas trap section being overwhelmed by the pressure in the isolated conduit and flattened or otherwise reduced in volume when the gas trapped in the gas trap section expands.

As the gas trap section is connected to the upper part of the gas-liquid separation tank, and the inner diameter of the gas-liquid separation tank and the inner diameter of the portion where the gas trap section and the gas-liquid separation tank are joined together are set to more than 8 mm according to the present invention, the gas separated from the solution in the gas-liquid separation tank can quickly move into the gas trap section. Therefore, the invention enables the reliable separation of gas from the solution and thereby prevents the gas from entering the pump and impairing the accuracy of the pump in feeding the solution.

According to the invention, the invention includes a sensor designed to detect gas when the gas in the gas trap section expands to 1.1 to 9.5 times the initial volume. Therefore, even in cases where the tube is not inserted into the container a sufficient depth or where the pump has a low output rate, the invention enables the reliable detection of depletion of the solution in the container and thus prevents the solution from undesirably remaining in the container.

According to the invention, the solution inlet of the gas-liquid separation tank connected to the isolated conduit is located higher than the solution outlet, and the gas detection sensor installed in the gas-liquid separation tank is located between the solution inlet and the solution outlet so that the downstream portion of the isolated conduit with respect to the point immediately under the solution outlet in the gas-liquid separation tank is ensured to be filled with the solution when the gas detection sensor detects expansion of the gas and causes the pump to be stopped. Thus, the invention reliably prevents the gas in the gas trap section from inadvertently entering the pump when the gas is discharged therefrom.

According to the structure of the solution feeding apparatus, either the tip of the end portion of the tube to be connected to the container or the tip of a needle attached to the tube end portion has a conical shape, and a solution intake opening or solution intake openings are formed in the wall of the tube end portion of the needle, at an appropriate distance from the tip of the tube end portion or the needle. Therefore, the solution feeding apparatus is capable of maintaining the container in an airtight state and preventing leakage of solution by thus preventing the container from being torn when pierced with the tube.

According to the invention, solution can be fed from a container selected from among numerous containers prepared beforehand. As the invention thus enables the long-term continuous feeding, it is capable of substantially reducing the labor and operation hours, which have heretofore been required by preparation of solutions.

The invention also enables the continuous feeding by switching the source of solution from a container to another container. Therefore, it is not only capable of substantially reducing the burden imposed on the operator to monitor the precise timing for replacing the container but also ensuring the reliable feeding of solution even it the apparatus is used in a circumstance where no operator is constantly stationed near the apparatus.

As the intention is capable of controlling a desired number of isolated conduits by means of a single valve to feed a solution, it is possible to simplify the structure of the apparatus and make the entire apparatus compact.

As is true in the aforementioned feature of the invention, the invention enables the elimination of a part of the apparatus and is therefore capable of making the entire apparatus compact.

The invention eliminates the possibility of erroneous activation of the gas detection sensor, prevents gas from entering the pump, and thereby ensures the solution in the container to be fed until the container is completely empty.

What is claimed is:

1. A solution feeding apparatus characterized in that:

a container hermetically containing a solution is made of a polymer that permits the container to change its shape in accordance with the amount of its content;

said container is removably connected to a tube for forming an isolated conduit extending from the container via a pump to the destination to which the solution is fed;

said isolated conduit is provided with a gas-liquid separation tank for separating gas from the solution and a gas trap section communicating with the gas-liquid separation tank, the gas-liquid separation tank and the gas trap section located between the container and the pump; and that said gas trap section has a variable volume.

2. A solution feeding apparatus as claimed in claim 1, wherein at least one of the layers that constitute the container to be connected to the tube is made of polyolefin-based resin.

3. A solution feeding apparatus as claimed in claim 1, wherein the apparatus includes a fastening mechanism for maintaining a constant volume in the gas trap section.

4. A solution feeding apparatus as claimed in any one of the claims from claim 1, wherein said gas trap section is connected to the upper part of the gas-liquid separation tank, and the inner diameter of the gas-liquid separation tank and the inner diameter of the portion where the gas trap section and the gas-liquid separation tank are joined together are at least 8 mm.

5. A solution feeding apparatus as claimed in claim 1, wherein the apparatus further comprises a sensor designed to detect gas in the gas trap section.

6. A solution feeding apparatus as claimed in claim 5, wherein said sensor detects gas when the gas in the gas trap section expands to 1.1 to 9.5 times the initial volume.

7. A solution feeding apparatus as claimed in claim 5, wherein the solution inlet of the gas-liquid separation tank connected to the isolated conduit is located higher than the solution outlet, and said gas detection sensor installed in the gas-liquid separation tank is located between the solution inlet and the solution outlet.

8. A solution feeding apparatus as claimed in claim 1, wherein either the tip of the end portion of said tube to be connected to the container or the tip of a needle attached to said tube end portion has a conical shape, and at least one solution intake opening is formed in the wall of the tube end portion or the needle, at a predetermined distance from the tip of the tube end portion or the needle.

9. A solution feeding apparatus comprising:

a predetermined number of isolated conduits extending to a predetermined number of destinations to which the solution is desired to be fed are formed by connecting a tube to at least one container hermetically containing a solution and made of a high polymer that permits the container to change its shape in accordance with the amount of its content;

each isolated conduit being coupled to a pump and is provided, at a location between the associated container and the pump, with a gas-liquid separation tank for separating gas from the solution and a gas trap section communicating with the gas-liquid separation tank; and that any one of the isolated conduits may selectively be operated by means of a respective gas detection sensor installed in the corresponding gas trap section.

10. A solution feeding apparatus as claimed in claim 9, wherein the isolated conduits are connected to a single selector valve that is provided with a common tube extending through a pump to the destination to which the solution is fed.

11. A solution feeding apparatus as claimed in claim 9, wherein each isolated conduit is provided with a stop valve, and the apparatus further includes a common tube that extends from said stop valves through a pump to the destination to which the solution is fed.

12. A solution feeding method comprising the steps of:

sealing a solution in a container which is capable of changing its shape in accordance with the amount of its content;

connecting a tube to said container, said tube serving to form an isolated conduit extending via a pump to the destination to which the solution is fed;

providing said isolated conduit with a gas-liquid separation tank and a gas trap section that communicates with the gas-liquid separation tank, at a location between the container and the pump, said gas-liquid separation tank adapted to separate the gas that has entered the conduit from the solution, and the gas trap section adapted to confine therein the gas separated in the gas-liquid separation tank; and wherein said gas trap section maintains a constant volume until all the solution in the container is consumed.

* * * * *